United States Patent [19]

Hunsbedt et al.

[11] Patent Number: 5,406,602

[45] Date of Patent: Apr. 11, 1995

[54] PASSIVE AIR COOLING OF LIQUID METAL-COOLED REACTOR WITH DOUBLE VESSEL LEAK ACCOMMODATION CAPABILITY

[75] Inventors: Anstein Hunsbedt, Los Gatos; Charles E. Boardman, Saratoga, both of Calif.

[73] Assignee: General Electric Company, San Jose, Calif.

[21] Appl. No.: 228,527

[22] Filed: Apr. 15, 1994

[51] Int. Cl.⁶ .............................................. G21C 15/18
[52] U.S. Cl. ..................................... 376/299; 376/290; 376/293
[58] Field of Search ............... 376/280, 287, 288, 290, 376/293, 298, 299

[56] References Cited

U.S. PATENT DOCUMENTS

| | | | |
|---|---|---|---|
| 4,508,677 | 4/1985 | Craig et al. | 376/299 |
| 5,043,136 | 8/1991 | Hunsbedt et al. | 376/299 |
| 5,190,720 | 3/1993 | Hunsbedt et al. | 376/299 |
| 5,223,210 | 6/1993 | Hunsbedt et al. | 376/299 |

*Primary Examiner*—Daniel D. Wasil
*Attorney, Agent, or Firm*—J. E. McGinness

[57] ABSTRACT

A passive and inherent shutdown heat removal method with a backup air flow path which allows decay heat removal following a postulated double vessel leak event in a liquid metal-cooled nuclear reactor. The improved reactor design incorporates the following features: (1) isolation capability of the reactor cavity environment in the event that simultaneous leaks develop in both the reactor and containment vessels; (2) a reactor silo liner tank which insulates the concrete silo from the leaked sodium, thereby preserving the silo's structural integrity; and (3) a second, independent air cooling flow path via tubes submerged in the leaked sodium which will maintain shutdown heat removal after the normal flow path has been isolated.

11 Claims, 5 Drawing Sheets

PASSIVE AIR COOLING OF LIQUID METAL-COOLED REACTOR WITH DOUBLE VESSEL LEAK ACCOMMODATION CAPABILITY

The Government of the United States of America has rights in this invention in accordance with Contract No. DEAC03-89SF17445 awarded by the Department of Energy.

FIELD OF THE INVENTION

The present invention relates generally to liquid metal-cooled nuclear reactors and to air cooling thereof. In particular, the invention relates to the passive removal of reactor decay and sensible heat from a liquid metal reactor and the transport of the heat to a heat sink (i.e., atmospheric air) by the inherent heat transfer processes of conduction, radiation, convection and natural convection of fluids.

BACKGROUND OF THE INVENTION

In the Advanced Liquid Metal Reactors (ALMR), a reactor core of fissionable fuel is submerged in a hot liquid metal, such as liquid sodium, within a reactor vessel. The liquid metal is used for cooling the reactor core, with the heat absorbed thereby being used to produce power in a conventional manner.

A known version of an ALMR plant (shown in FIG. 1) has a concrete silo 8 which is annular or circular. The silo is preferably disposed underground and contains concentrically therein an annular containment vessel 2 in which is concentrically disposed a reactor vessel 1 having a nuclear reactor core 12 submerged in a liquid metal coolant such as liquid sodium. The annular space between the reactor and containment vessels is filled with an inert gas such as argon. The reactor and containment vessels are supported or suspended vertically downward from an upper frame 16, which in turn is supported on the concrete silo 8 by a plurality of conventional seismic isolators 18 to maintain the structural integrity of the containment and reactor vessels during earthquakes and allow uncoupled movement between those vessels and the surrounding silo.

Operation of the reactor is controlled by neutron-absorbing control rods 15 which are selectively inserted into or withdrawn from the reactor core. During operation of the reactor, it may be necessary to shut down the fission reaction of the fuel for the purpose of responding to an emergency condition or performing routine maintenance. The reactor is shut down by inserting the control rods into the core of fissionable fuel to deprive the fuel of the needed fission-producing neutrons. However, residual decay heat continues to be generated from the core for a certain time. This heat must be dissipated from the shut-down reactor.

The heat capacity of the liquid metal coolant and adjacent reactor structure aid in dissipating the residual heat. For instance, heat is transferred by thermal radiation from the reactor vessel to the containment vessel. As a result, the containment vessel experiences an increase in temperature. Heat from the containment vessel will also radiate outwardly toward a concrete silo spaced outwardly therefrom. These structures may not be able to withstand prolonged high temperatures. For example, the concrete making up the walls of the typical silo may splay and crack when subjected to high temperatures.

To prevent excessive heating of these components, a system for heat removal is provided. One of the heat removal systems incorporated in the ALMR is entirely passive and operates continuously by the inherent processes of natural convection in fluids, conduction, convection, and thermal radiation. This safety-related system, referred to as the reactor vessel auxiliary cooling system (RVACS), is shown schematically in FIG. 1. Heat is transported from the reactor core to the reactor vessel 1 by natural convection of liquid sodium. The heat is then conducted through the reactor vessel wall. Heat transfer from the reactor vessel outside surface to the colder containment vessel 2 across the argon-filled gap 3 is almost entirely by thermal radiation. An imperforate heat collector cylinder 5 is disposed concentrically between the containment vessel 2 and the silo 8 to define a hot air riser 4 between the containment vessel and the inner surface of the heat collector cylinder, and a cold air downcomer 7 between the silo and the outer surface of the heat collector cylinder. Heat is transferred from the containment vessel 2 to the air in the hot air riser 4. The inner surface of heat collector cylinder 5 receives thermal radiation from the containment vessel, with the heat therefrom being transferred by natural convection into the rising air for upward flow to remove the heat via air outlets 9. Heat transfer from the containment vessel outer surface is approximately 50% by natural convection to the naturally convecting air in the hot air riser 4 and 50% by radiation to the heat collector cylinder 5.

Heating of the air in the riser 4 by the two surrounding hot steel surfaces induces natural air draft in the system with atmospheric air entering through four air inlets 6 above ground level. The air is ducted to the cold air downcomer 7, then to the bottom of the concrete silo 8, where it turns and enters the hot air riser 4. The hot air is ducted to the four air outlets 9 above ground level. The outer surface of heat collector cylinder 5 is covered with thermal insulation 5a (see FIG. 2) to reduce transfer of heat from heat collector cylinder 5 into silo 8 and into the air flowing downward in cold air downcomer 7. The greater the differential in temperature between the relatively cold downcomer air and the relatively hot air within the riser, the greater will be the degree of natural circulation for driving the air cooling passively, e.g., without motor-driven pumps.

The above description applies to normal reactor operation and shutdown heat removal when the sodium within the reactor vessel is at its normal level 10. In accordance with the foregoing ALMR concept, the reactor vessel and its closure function as the primary coolant boundary. A steel dome located above the reactor closure functions as the primary containment above the closure elevation. Below the reactor closure elevation, the containment vessel functions both as a guard vessel (for leak protection) and as the containment.

The ALMR containment has been shown to be effective against all design basis events and most beyond design basis (BDB) events and is considered to meet and exceed present U.S. licensing requirements. However, it is possible for significant radiological releases to occur under a postulated BDB event in which both the reactor and containment vessels fail. If leaks should develop in both the reactor vessel 1 and the containment vessel 2, the sodium level may drop as low as the double vessel leak level 11 (see FIG. 1). Under such conditions, atmospheric air can come in direct contact with radioactive sodium. Thus, there is the potential for major sodium fires and the escape of radioactive products directly to the atmosphere through the RVACS air inlet and outlet ducts. In addition, the RVACS will be rendered inoperative. This loss of cooling capability would result in heat-up and a slow (five-day) sodium boil-off followed by a core melt-through, which in turn would be followed by a more severe radiological release. These are the major disadvantages with the known ALMR concept.

SUMMARY OF THE INVENTION

The present invention is an improvement which seeks to eliminate the aforementioned disadvantages of the prior art passive air cooling system while retaining the basic ALMR configuration. The invention utilizes a novel passive and inherent shutdown heat removal method with a backup air flow path which allows decay heat removal following a postulated double vessel leak event. The improved reactor design incorporates the following features: (1) isolation capability of the reactor cavity environment in the event that simultaneous leaks develop in both the reactor and containment vessels; (2) a reactor silo liner tank which insulates the concrete silo from the leaked sodium, thereby preserving the silo's structural integrity; and (3) a second, independent air cooling flow path via tubes submerged in the leaked sodium which will maintain shutdown heat removal after the normal flow path has been isolated.

This disclosure describes a modified passive cooling concept in which the simplicity and reliability advantages of passive cooling are combined with the capability for isolating the reactor cavity environment from the outside air environment should a double vessel leak occur, while maintaining passive air cooling. Thus, this concept provides an additional level of defense against the extremely low probability event described above.

The main advantage of the invention is that it allows use of the highly reliable redundant passive shutdown cooling system in combination with closable and more conventional containments. Such a design approach is expected to have reduced public risk as compared to the current ALMR design because in addition to the highly reliable active and passive "protective" systems, additional severe accident mitigating capability is provided for BDB events such as the postulated double vessel leak event.

DETAILED DESCRIPTION OF THE PREFERRED EMBODIMENTS

Figure 1:
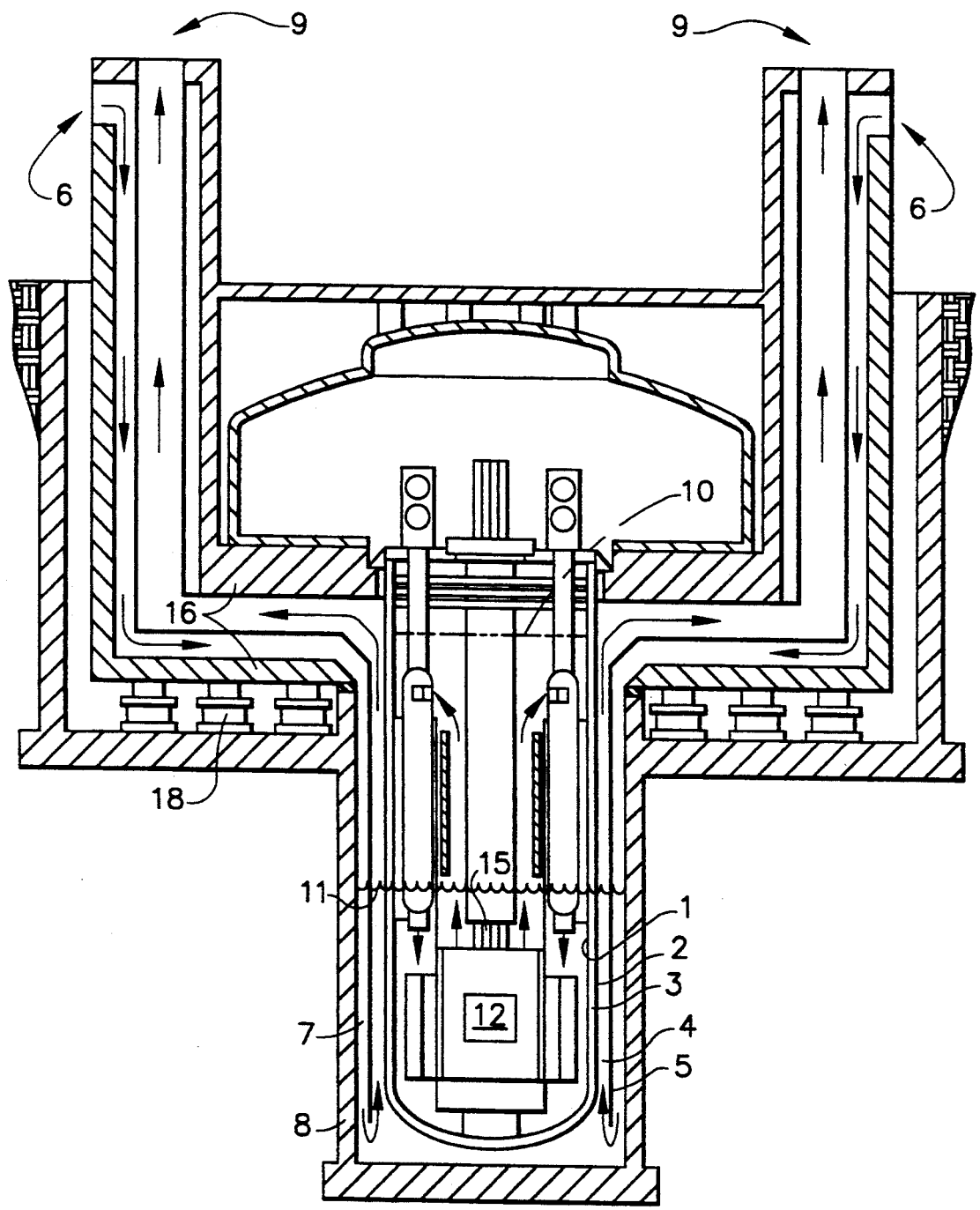
FIG. 1 is a schematic illustration of a conventional liquid metal-cooled nuclear reactor in cross section, showing the reactor vessel auxiliary cooling system.
Figure 2:
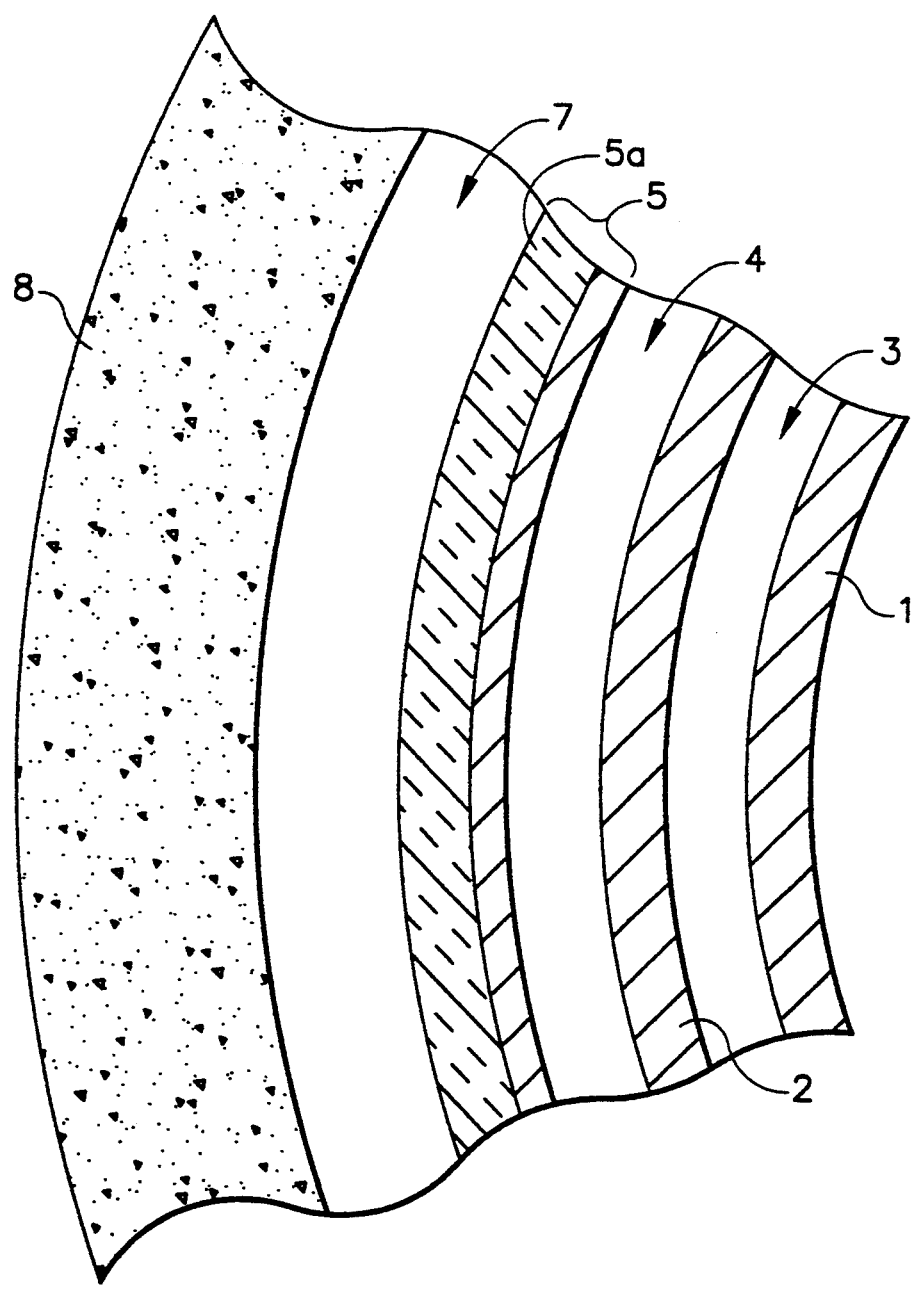
FIG. 2 is a partial radial sectional view of a detailed portion of the reactor depicted in FIG. 1, the section being taken at an elevation within the reactor core zone.
Figure 3:
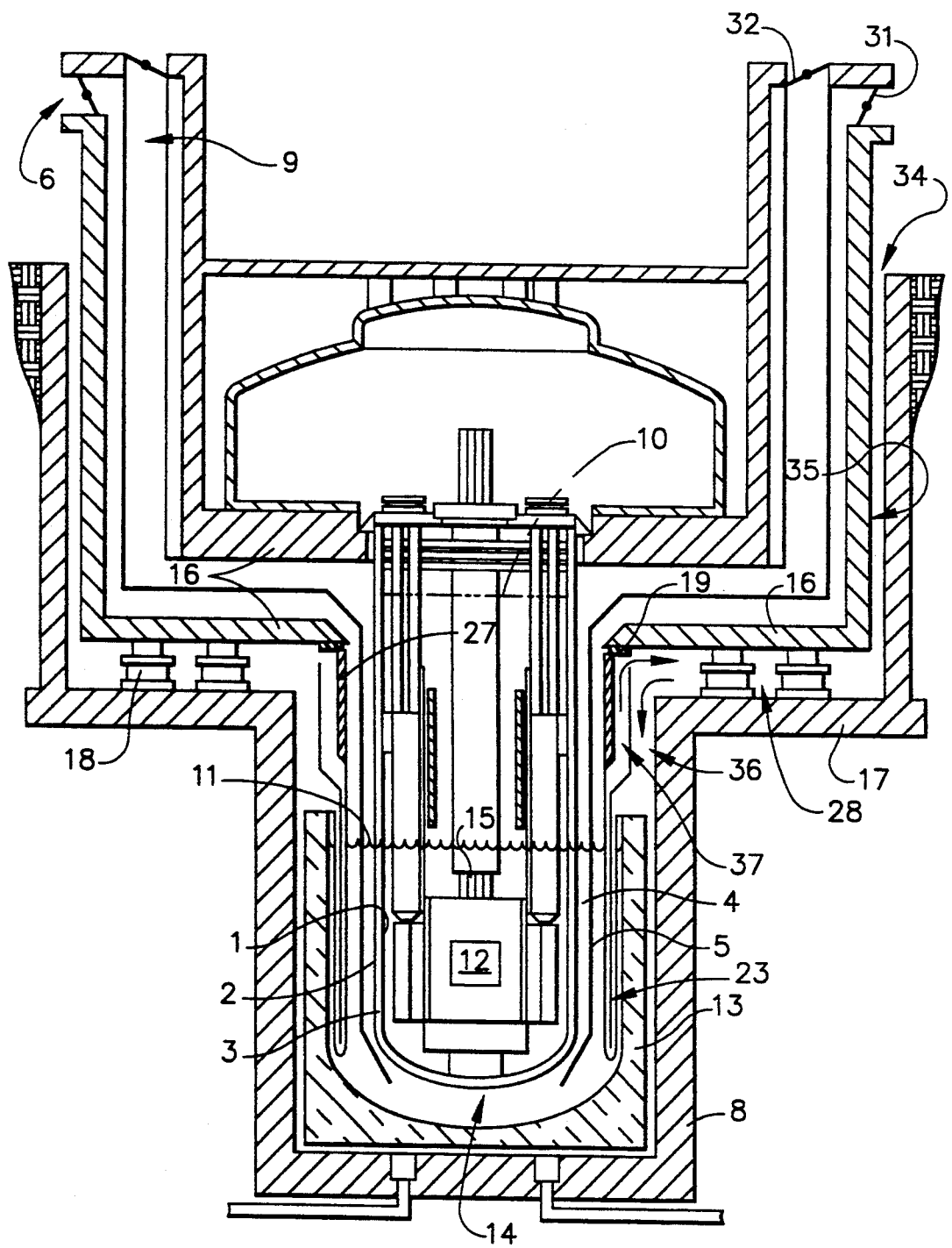
FIG. 3 is a schematic illustration of a liquid metal-cooled nuclear reactor in accordance with a preferred embodiment of the invention in cross section.

The basic concepts of the invention, including a silo liner tank, a closable RVACS and backup air cooling of the leaked sodium, are shown in FIG. 3. The invention is utilized in conjunction with a conventional RVACS as described with reference to FIG. 1. In addition, however, RVACS inlet isolation valves 31 are provided in the four main RVACS air inlets 6 (only two of which are shown) and RVACS outlet isolation valves 32 are provided in the four RVACS air outlets 9 (only two of which are shown). The RVACS isolation valves 31 and 32 can be closed if leaks should develop in the reactor vessel 1 and containment vessels 2 that result in sodium entering the reactor cavity 14. Closing of the isolation valves 31 and 32 shuts off the oxygen supply to the reactor cavity 14, thereby suffocating any sodium fires that might have started initially when sodium entered the cavity.

Figure 4:
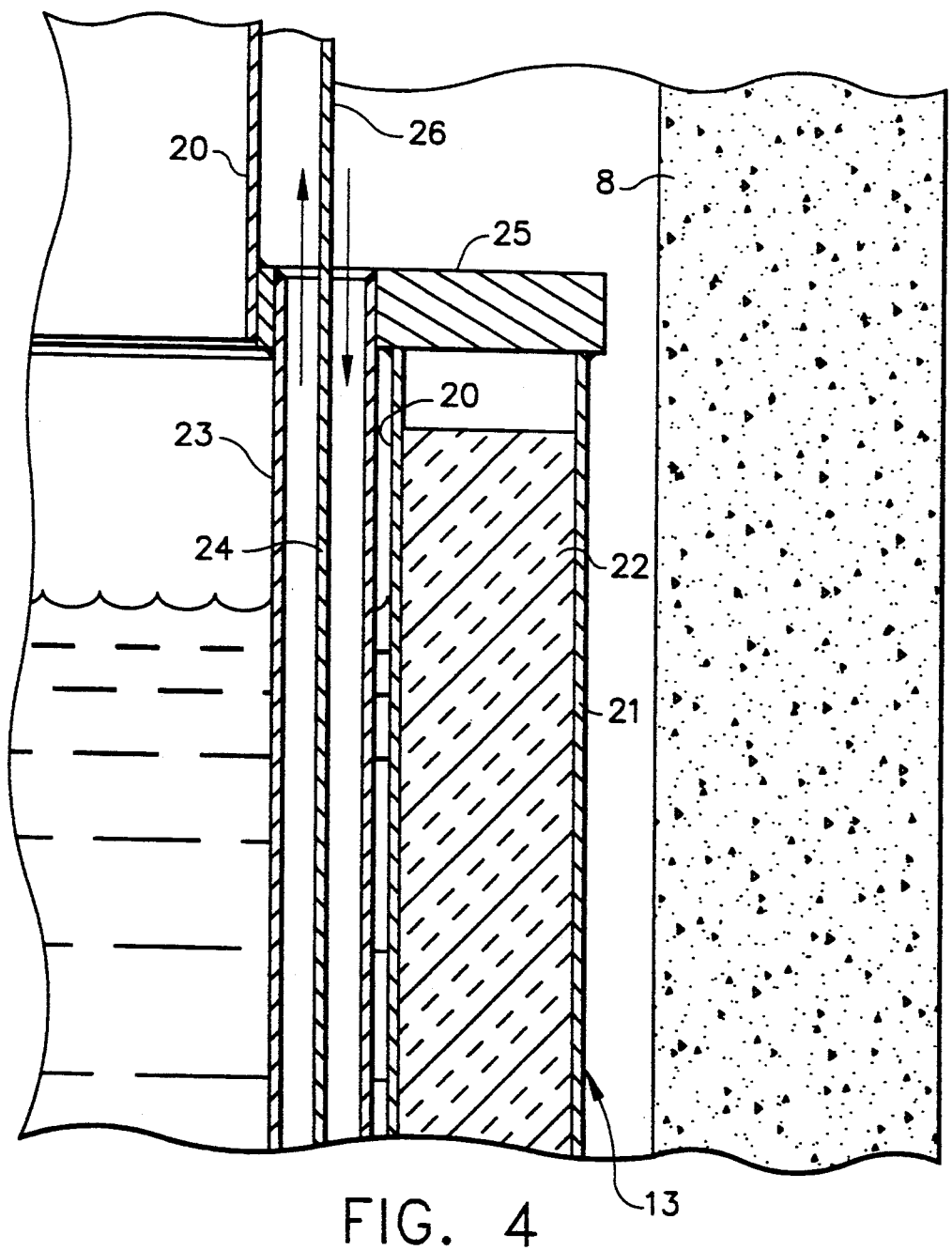
FIG. 4 is a partial azimuthal sectional view of a detailed portion of the reactor depicted in FIG. 1, the section being taken at the sodium leak level.
Figure 5:
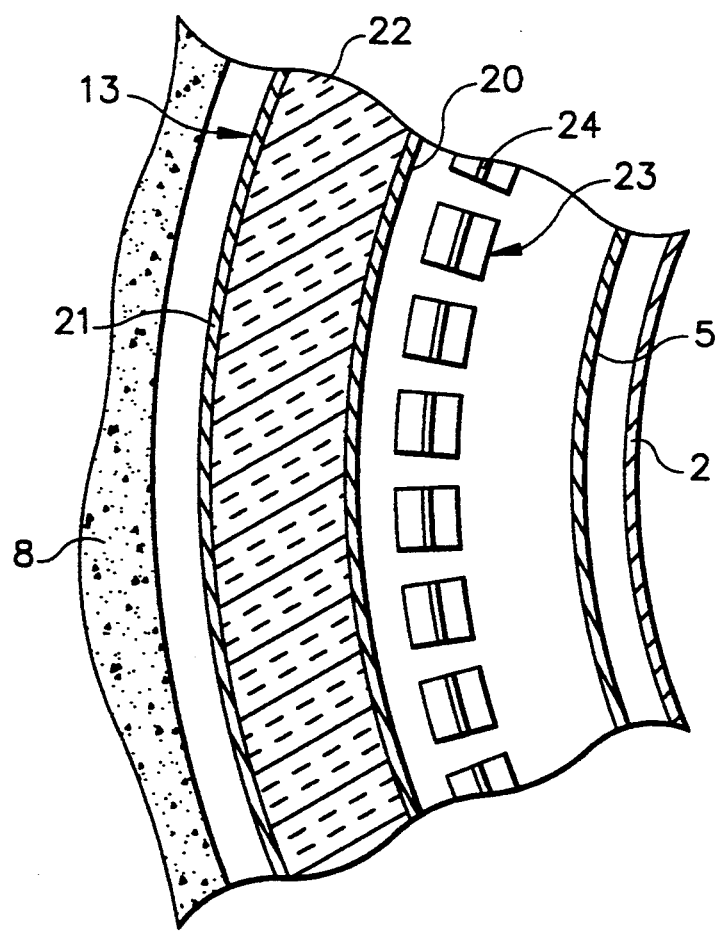
FIG. 5 is a partial radial sectional view of a detailed portion of the reactor depicted in FIG. 3, the section being taken at an elevation within the reactor core zone.

A bottom-supported, insulated silo liner tank 13 is provided to collect any sodium leaked and to prevent direct contact between sodium and the concrete of the reactor silo 8, thus preventing exothermic chemical reactions and maintaining the structural integrity of the reactor silo during the postulated double vessel leak event. As illustrated in FIGS. 4 and 5, the lower portion of the silo liner tank 13 consists of an inner steel liner 20 and an outer steel liner 21 containing a nonreactive granular insulating material 22 such as BeO.

A multiplicity of split heat transfer tubes 23, of square cross section and containing tube divider plates 24, are attached to an annular tube plate 25 located at an elevation above the sodium leak level 11. Tube plate 25 is attached to the inner steel liner 20 and also to the outer steel liner 21. Above the tube plate 25, the inner steel liner 20 extends upwards and has a reduced diameter, as shown in FIG. 4. The multiple tube divider plates 24 are joined together to form a continuous cylinder referred to as the tube divider plate extension 26 above the elevation of the tube plate.

A sliding seal 19 is provided at the top edge of the silo liner tank inner liner 20 where it meets the reactor facility base 16 to completely seal off the normal RVACS flow path from the outside atmosphere when the RVACS air supply isolation valves 31 and 32 are closed. Radiation shielding 27 is attached to the outer surface of the upper narrow-diameter portion of the silo liner tank inner liner 20 to limit radiation exposure in the seismic isolator gallery 28 between the base mat 17 and facility base 16.

In accordance with the concept of the invention, decay heat removal is provided during a postulated double vessel leak event by a second backup RVACS consisting of multiple split heat transfer tubes 23 submerged in the hot, leaked sodium, as shown in FIGS. 3 and 4. Air for the backup RVACS enters the seismic isolation gap 35 via several backup air openings 34 and enters the cold air downflow path 36 via the seismic isolator gallery 28. The annular cold air downflow path 36 is formed by the space between the tube divider plate extension 26 and the reactor silo 8 above the elevation of the tube plate. At the tube plate elevation the cold air enters the outer halves of the split tubes 23 and flows downward as it is heated by the hot, leaked sodium flowing freely around the outside perimeter of the split tubes.

The air reverses at the bottom of the split tubes and enters the hot air upflow path consisting of the inner halves of the split heat transfer tubes 23 below the tube plate elevation. Above the tube plate elevation, the air stream—now heated by the hot steel walls of the heat transfer tubes 23 which are submerged in hot leaked sodium—enters the hot air upflow path 37 formed by the upper narrow-diameter portion of inner steel liner 20 and the tube divider plate extension 26. The hot air upflow path 37 discharges into the seismic isolator gallery 28 and flows upwards in the seismic isolation gap 35.

The hot air is discharged to the atmosphere at grade level through backup air openings 34. Simultaneous inflow of cold air and upflow of hot air in the seismic isolation gap 35 is possible because the annular gap extends completely around the reactor facility base 16. The huge flow area allows downflow and upflow zones to be established. Thus, the backup RVACS air flow path is separate from the normal RVACS air supply and discharge paths and is not closed off when the RVACS air supply isolation valves 31 and 32 are closed. In addition, there can be no direct contact between air and sodium and between sodium and concrete. The insulated double wall silo liner tank 13 prevents heat-up of the concrete silo 8 and is a durable containment for the leaked sodium via the use of a nonreactive granular insulation 22 (see FIG. 4) which protects the outer wall 21 of the silo liner tank 13. Reactor heat is removed by the backup RVACS at all times, including normal reactor operating conditions and RVACS decay heat removal operating conditions. However, heat removal by the backup RVACS increases significantly when the silo liner tank is partially filled with sodium following a postulated double vessel leak event and the hot sodium surrounds the split heat transfer tubes 23 to the double vessel leak level 11 (see FIGS. 3 and 4). Analyses have demonstrated that heat removal by the backup RVACS will maintain maximum bulk sodium temperatures below the design limit. However, limited fuel cladding failures are expected during this postulated event.

Thus, the basic concepts of the invention are that an independent, backup passive shutdown heat removal cooling system is used in conjunction with the conventional RVACS and the capability is provided to isolate the conventional RVACS. These concepts have been illustrated by disclosure of the foregoing preferred embodiment. However, it is understood that these novel containment concepts are subject to change following tradeoff and detailed thermal performance evaluations without departing from the spirit and scope of the invention. Also, routine variations and modifications of the disclosed apparatus will be readily apparent to practitioners skilled in the art of passive air cooling systems for liquid metal-cooled nuclear reactors. All such variations and modifications are intended to be encompassed by the claims set forth hereinafter.

We claim:

1. A liquid metal-cooled nuclear reactor comprising:
   a containment vessel;
   a reactor vessel surrounded by said containment vessel with a space therebetween;
   a nuclear fuel core arranged inside said reactor vessel;
   a heat collector cylinder surrounding said containment vessel with a space therebetween;
   a silo surrounding said heat collector cylinder;
   air inlet means;
   air outlet means;
   a reactor vessel auxiliary cooling system having first air circulation flowpath means in flow communication with said air inlet means and said air outlet means, said first air circulation flowpath means extending downward between said containment vessel and said silo for removing heat therefrom by passive air cooling;
   a backup reactor vessel auxiliary cooling system comprising second air circulation flowpath means which extend into said space between said silo and said containment vessel for removing heat therefrom by passive air cooling, a lower portion of said second air circulation flowpath means being submerged in liquid metal after the occurrence of simultaneous leaks in said reactor vessel and in said containment vessel, said second air circulation flowpath means forming a barrier against entry of liquid metal therein, wherein said second air circulation flowpath means comprises a circumferential array of split heat transfer tubes, each of said split heat transfer tubes comprising an open top end, a closed bottom end and a tube divider plate which extends from said open top end to a height above said bottom end, said tube divider plate separating the internal volume of said split heat transfer tube into first and second vertical channels, and a bottom end of said first vertical channel being in flow communication with a bottom end of said second vertical channel via a flow reversal path
   means for flow communication between an atmosphere external to said reactor and said second air circulation flowpath means, a top end of each of said first and second vertical channels being in flow communication with said external atmosphere via said flow communication means;
   a silo liner tank installed between said silo and said first and second air circulation flowpath means, said silo liner tank comprising a cylindrical inner steel liner, a cylindrical outer steel liner and thermal insulation means sandwiched therebetween; and
   an annular tube plate connected to said inner and outer steel liners, said circumferential array of split heat transfer tubes being supported by said tube plate.

2. The liquid metal-cooled nuclear reactor as defined in claim 1, wherein first valve means are installed in said air inlet means and second valve means are installed in said air outlet means, said first and second valve means being in an open state during normal reactor operation and in a closed state in response to the presence of simultaneous leaks in said reactor vessel and in said containment vessel that result in leakage of liquid metal into said space between said silo and said containment vessel.

3. The liquid metal-cooled nuclear reactor as defined in claim 1, wherein said flow communication means comprises a seismic isolator gallery.

4. The liquid metal-cooled nuclear reactor as defined in claim 1, wherein said thermal insulation means comprises packed granular material having the property of being nonreactive with said liquid metal.

5. A liquid metal-cooled nuclear reactor comprising:
   a containment vessel;
   a reactor vessel surrounded by said containment vessel with a space therebetween;
   a nuclear fuel core arranged inside said reactor vessel;
   a silo surrounding said containment vessel with a space therebetween;
   air inlet means;
   air outlet means;
   first air circulation flowpath means in flow communication with said air inlet means and said first air outlet means, said first air circulation flowpath means extending into said space between said silo and said containment vessel for removing heat therefrom by passive air cooling;

second air circulation flowpath means extending into said space between said silo and said containment vessel for removing heat therefrom by passive air cooling, a lower portion of said second air circulation flowpath means being submerged in liquid metal after the occurrence of simultaneous leaks in said reactor vessel and in said containment vessel, said second air circulation flowpath means forming a barrier against entry of liquid metal therein, wherein said second air circulation flowpath means comprises a circumferential array of split heat transfer tubes, each of said split heat transfer tubes comprising an open top end, a closed bottom end and a tube divider plate which extends from said open top end to a height above said bottom end, said tube divider plate separating the internal volume of said split heat transfer tube into first and second vertical channels, a bottom end of said first vertical channel being in flow communication with a bottom end of said second vertical channel via a flow reversal path;

means for flow communication between an atmosphere external to said reactor and said second air circulation flowpath means, a top end of each of said first and second vertical channels being in flow communication with said external atmosphere via said flow communication means;

a silo liner tank installed between said silo and said first and second air circulation flowpath means, wherein said silo liner tank comprises a cylindrical inner steel liner, a cylindrical outer steel liner and thermal insulation means sandwiched therebetween; and an annular tube plate connected to said inner and outer steel liners, said circumferential array of split heat transfer tubes being supported by said tube plate.

6. The liquid metal-cooled nuclear reactor as defined in claim 5, wherein said flow communication means comprises a seismic isolator gallery.

7. The liquid metal-cooled nuclear reactor as defined in claim 5, wherein said thermal insulation means comprises packed granular material having the property of being nonreactive with said liquid metal.

8. A liquid metal-cooled nuclear reactor comprising a containment vessel, a reactor vessel surrounded by said containment vessel with a space therebetween, a nuclear fuel core arranged inside said reactor vessel, a heat collector cylinder surrounding said containment vessel with a space therebetween, a silo surrounding said heat collector cylinder, air inlet means, air outlet means, a reactor vessel auxiliary cooling system having first air circulation flowpath means in flow communication with said air inlet means and said air outlet means, said first air circulation flowpath means extending into said space between said silo and said containment vessel for removing heat therefrom by passive air cooling, leak containment means for containing liquid metal in the event of a double vessel leak installed between said silo and said first air circulation flowpath means, a circumferential array of split heat transfer tubes in flow communication with a seismic isolator gallery, and tube supporting means for supporting said split heat transfer tubes within an inner periphery of said leak containment means, said tube supporting means being attached to said leak containment means.

9. The liquid metal-cooled nuclear reactor as defined in claim 8, further comprising first valve means installed in said air inlet means and second valve means installed in said air outlet means, said first and second valve means being in an open state during normal reactor operation and in a closed state in response to the presence of simultaneous leaks in said reactor vessel and in said containment vessel.

10. The liquid metal-cooled nuclear reactor as defined in claim 8, wherein said leak containment means comprises a cylindrical inner steel liner, a cylindrical outer steel liner and thermal insulation means sandwiched therebetween, and said tube supporting means comprises an annular tube plate connected to said inner and outer steel liners.

11. The liquid metal-cooled nuclear reactor as defined in claim 10, wherein said thermal insulation means comprises packed granular material having the property of being nonreactive with said liquid metal.

* * * * *